US012316031B2

(12) United States Patent
Nishida

(10) Patent No.: US 12,316,031 B2
(45) Date of Patent: May 27, 2025

(54) ANTENNA DEVICE

(71) Applicant: Murata Manufacturing Co., Ltd., Nagaokakyo (JP)

(72) Inventor: Tsubasa Nishida, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 196 days.

(21) Appl. No.: 18/182,410

(22) Filed: Mar. 13, 2023

(65) Prior Publication Data

US 2023/0231309 A1 Jul. 20, 2023

Related U.S. Application Data

(63) Continuation of application No. PCT/JP2021/031213, filed on Aug. 25, 2021.

(30) Foreign Application Priority Data

Sep. 15, 2020 (JP) ................................ 2020-155000

(51) Int. Cl.
*H01Q 9/04* (2006.01)
*H01Q 5/335* (2015.01)

(52) U.S. Cl.
CPC .......... *H01Q 9/0414* (2013.01); *H01Q 5/335* (2015.01)

(58) Field of Classification Search
CPC ...... H01Q 9/0414; H01Q 5/335; H01Q 1/523; H01Q 9/285; H01Q 19/005; H01Q 21/08; H01Q 9/0421
See application file for complete search history.

(56) References Cited

U.S. PATENT DOCUMENTS 9,865,926 B2 1/2018 Ganchrow
2014/0085158 A1* 3/2014 Wong .................... H01Q 1/521 343/841

(Continued)

FOREIGN PATENT DOCUMENTS

CN 205194847 U 4/2016
CN 106229645 A 12/2016

(Continued)

OTHER PUBLICATIONS

International Search Report and Written Opinion mailed on Nov. 9, 2021, received for PCT Application PCT/JP2021/031213, filed on Aug. 25, 2021, 8 pages including English Translation.

(Continued)

*Primary Examiner* — Graham P Smith
(74) *Attorney, Agent, or Firm* — XSENSUS LLP

(57) ABSTRACT

A first edge of a ground plane extends in a first direction. A radiating element is arranged with a gap from the ground plane in a thickness direction of the ground plane. A feed line supplies a radio frequency signal to the radiating element. A pair of stubs are arranged at positions sandwiching the radiating element in the first direction. The stub is connected to the ground plane. In plan view, a distance from the radiating element to the first edge in a second direction orthogonal to the first direction is ¼ or less of a wavelength corresponding to a resonant frequency of the radiating element. Even when the radiating element is arranged close to an edge of the ground plane, disorder of a beam pattern may be reduced.

20 Claims, 18 Drawing Sheets

(56) References Cited

U.S. PATENT DOCUMENTS

| | | | | |
|---|---|---|---|---|
| 2021/0036432 | A1* | 2/2021 | Kim | H01Q 1/48 |
| 2021/0273334 | A1* | 9/2021 | Tachibana | H04B 1/0064 |

FOREIGN PATENT DOCUMENTS

| | | | | |
|---|---|---|---|---|
| EP | 2323217 | A1 | | 5/2011 |
| JP | 2005-203971 | A | | 7/2005 |
| JP | 2007-266855 | A | | 10/2007 |
| JP | 2008219574 | A | * | 9/2008 |
| WO | 2020/100412 | A1 | | 5/2020 |

OTHER PUBLICATIONS

Office Action issued Mar. 14, 2025 in counterpart Chinese Patent Application No. 202180062616 (8 pages).

* cited by examiner

ANTENNA DEVICE

CROSS-REFERENCE TO RELATED APPLICATIONS

The present application is a continuation of International Application No. PCT/JP2021/031213, filed Aug. 25, 2021, which claims priority to Japanese patent application No. 2020-155000, filed Sep. 15, 2020, the entire contents of each of which being incorporated herein by reference.

TECHNICAL FIELD

The present disclosure relates to an antenna device.

BACKGROUND ART

A patch antenna (referred to as a half patch antenna in the present specification) in which one side (rear edge) of a radiating element is short-circuited and an area of the radiating element is reduced to approximately ½ is disclosed in Patent Document 1 below. In the half patch antenna disclosed in Patent Document 1, desired radiation characteristics are obtained by shortening a distance in a lateral direction between a front edge, on a side opposite to the rear edge of the radiating element, and a corresponding edge of a ground plane.

CITATION LIST

Patent Document

Patent Document 1: U.S. Pat. No. 9,865,926

SUMMARY

Technical Problems

According to a study of the inventor of the present application, it has been found that when a radiating element is brought close to an edge of a ground plane, a beam pattern may be disordered. One, non-limiting, aspect of the present disclosure is to provide an antenna device capable of reducing disorder of a beam pattern even when the antenna device has a configuration in which a radiating element is brought close to an edge of a ground plane.

Solutions to Problems

According to one aspect of the present disclosure, provided is an antenna device, including

- a ground plane having a first edge extending in a first direction,
- a radiating element spaced apart from the ground plane by a gap in a thickness direction of the ground plane,
- a feed line to supply a radio frequency signal to the radiating element, and
- a pair of stubs connected to the ground plane and arranged at positions that sandwich the radiating element in the first direction,
- in which, in plan view, a distance from the radiating element to the first edge in a second direction orthogonal to the first direction is ¼ or less of a wavelength corresponding to a resonant frequency of the radiating element.

Advantageous Effects of Disclosure

It has been found that when a distance from a radiating element to a first edge is decreased, a radio-frequency current propagating along the first edge is generated in a ground plane, and a beam pattern is disordered by the radio-frequency current. A pair of stubs reduce the propagation of the radio-frequency current. As a result, the disorder of the beam pattern is reduced.

DESCRIPTION OF EMBODIMENTS

First Embodiment

An antenna device according to a first embodiment will be described with reference to FIG. 1 to FIG. 8.

Figure 1:
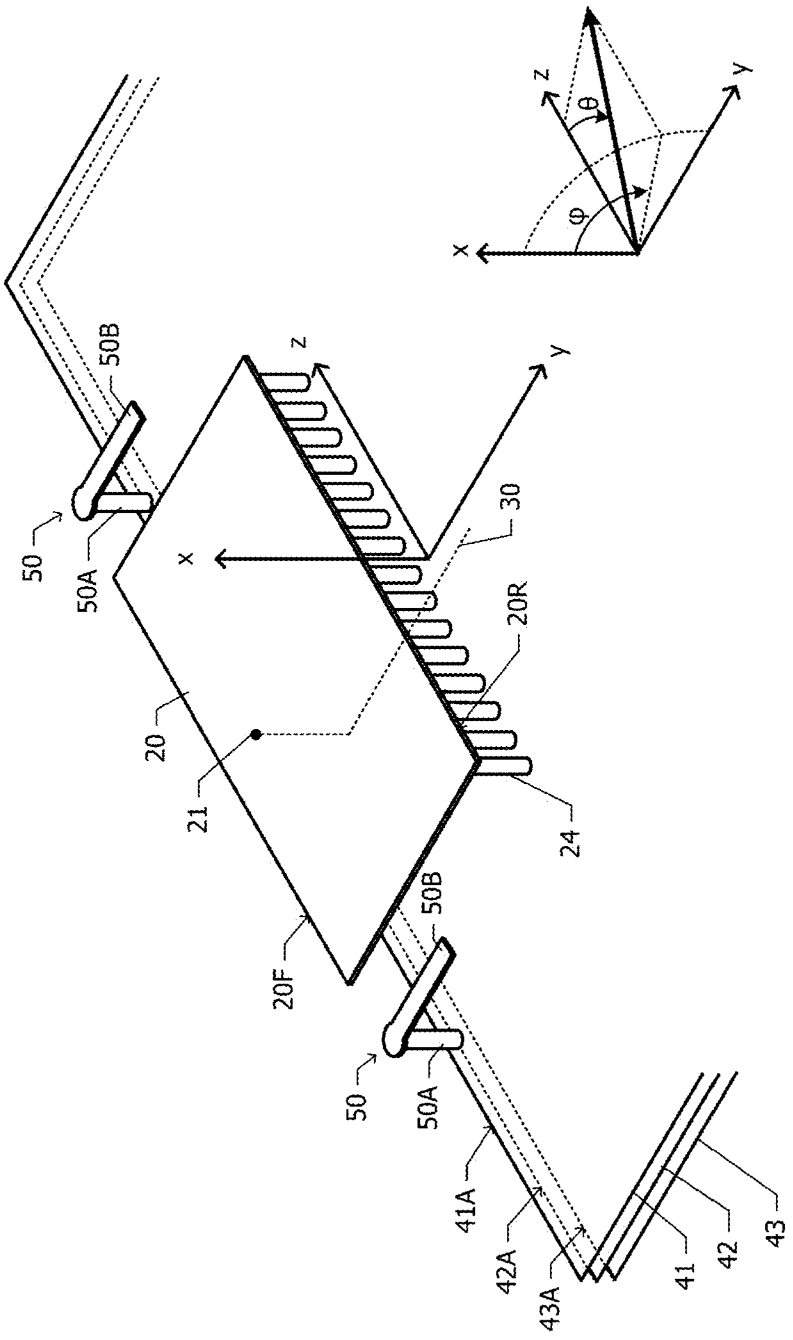
FIG. 1 is a perspective view of an antenna device according to a first embodiment illustrating a conductor portion thereof.
Figure 2:
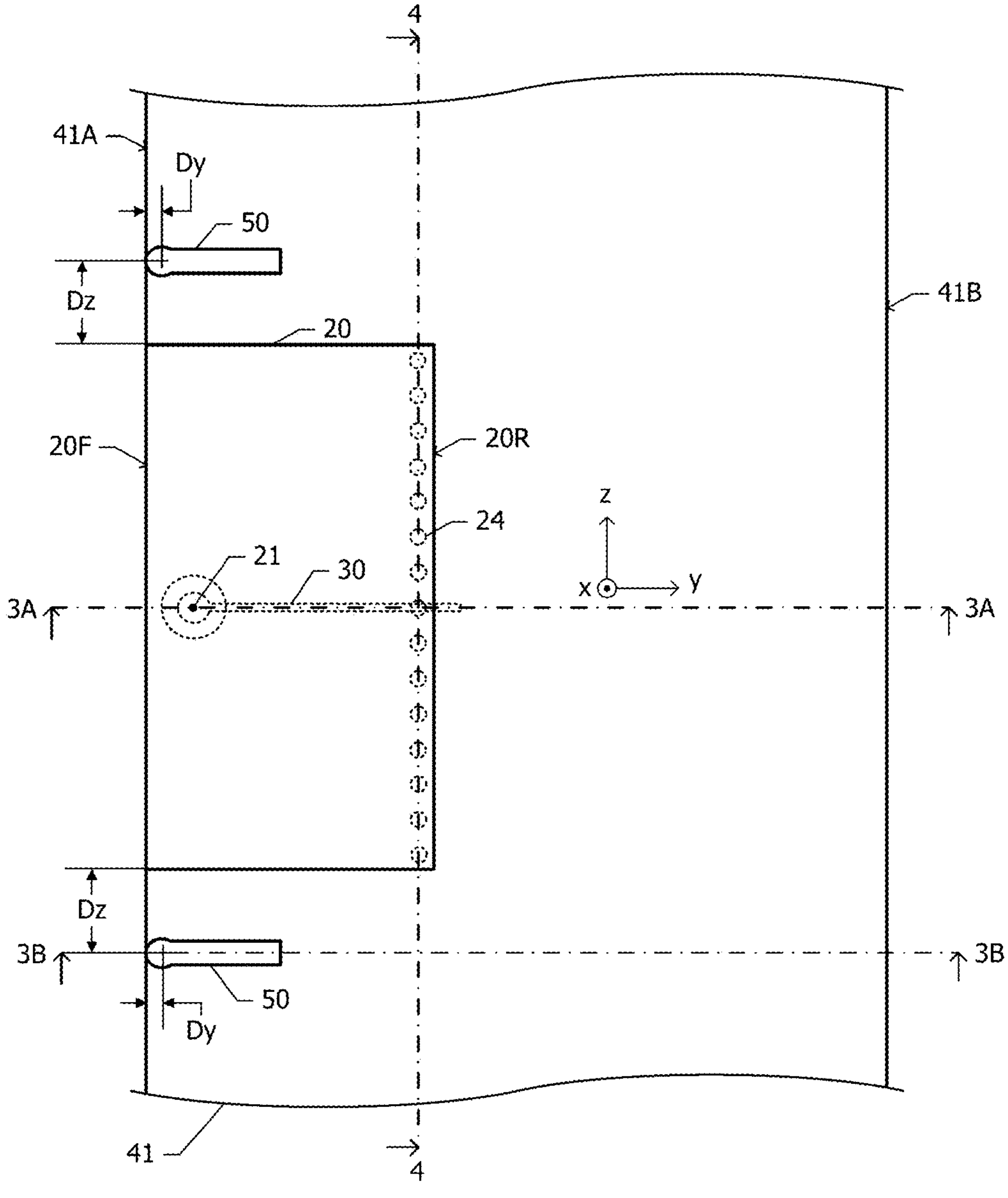
FIG. 2 is a plan view of the antenna device according to the first embodiment illustrating the conductor portion thereof.

FIG. 1 and FIG. 2 are a perspective view and a plan view, respectively, of the antenna device according to the first embodiment each illustrating a conductor portion thereof. The antenna device according to the first embodiment includes a ground plane 41 of a first layer, a ground plane 42 of a second layer, and a ground plane 43 of a third layer provided in a dielectric substrate 60, and a radiating element 20. A direction from the ground plane 43 of the third layer toward the ground plane 41 of the first layer is defined as an upward direction.

The radiating element 20 is arranged with a gap above the ground plane 41 of the first layer. The radiating element 20 is formed of a metal plate arranged parallel to the ground plane 41 and has a shape of a rectangle in plan view. An edge of the radiating element 20 corresponding to one long side of the rectangle is referred to as a front edge 20F. An edge on a side opposite to the front edge 20F is referred to as a rear edge 20R.

The ground plane 41 has a first edge 41A which is linear and a second edge 41B (FIG. 2) on a side opposite to the first edge 41A. The ground plane 42 of the second layer and the ground plane 43 of the third layer also have first edges 42A and 43A that coincide with the first edge 41A in plan view, respectively. In plan view, the radiating element 20 is arranged between the first edge 41A and the second edge 41B of the ground plane 41. The front edge 20F of the radiating element 20 overlaps part of the first edge 41A of the ground plane 41 in plan view.

An orthogonal coordinate system is defined in which a direction parallel to the first edge 41A is a z-direction, a direction orthogonal to the first edge 41A and parallel to the ground plane 41 is a y-direction, and a direction normal to the ground plane 41 is an x-direction. A direction from the first edge 41A toward the second edge 41B is defined as a positive direction of a y-axis. A direction from the ground plane 41 toward the radiating element 20 is defined as a positive direction of an x-axis. A direction from the radiating element 20 is represented by a polar angle $\theta$ based on a positive direction of a z-axis and an azimuth angle $\varphi$ based on the positive direction of the x-axis in an xy plane.

A feed line 30 is connected to a feed point 21 of the radiating element 20. The feed point 21 is positioned between the midpoint of the front edge 20F and a geometric center of the radiating element 20. A radio frequency signal is supplied to the radiating element 20 through the feed line 30. The configuration of the feed line 30 will be described later in detail with reference to FIG. 3A.

Multiple short-circuit vias 24 are arranged along the rear edge 20R of the radiating element 20. The multiple short-circuit vias 24 short-circuit the rear edge 20R of the radiating element 20 to the ground plane 41. The radiating element 20 and the ground plane 41 configure a half patch antenna.

Stubs 50 each connected to the ground plane 41 are arranged at positions sandwiching the radiating element 20 in the z-direction. The stub 50 includes a first portion 50A extending upward (in the positive direction of the x-axis) from the ground plane 41, and a second portion 50B extending in the positive direction of the y-axis from a tip end of the first portion 50A. A distance in the z-direction from a center of a connection position of the stub 50 and the ground plane 41 to the radiating element 20 is denoted by Dz. The distance Dz from one of the stubs 50 to the radiating element 20 is equal to the distance Dz from the other of the stubs 50 to the radiating element 20.

A distance from the center of the connection position of the stub 50 and the ground plane 41 to the first edge 41A of the ground plane 41 is denoted by Dy. The second portion 50B of the stub 50 includes a circular pad region having a size according to alignment accuracy in a manufacturing process at a connection position of the first portion 50A and the second portion 50B. The pad region is larger than the first portion 50A in plan view and includes the first portion 50A. The pad region included in the second portion 50B is arranged to be in contact with the first edge 41A in plan view. In the case above, the sum of a radius of the first portion 50A and an interval between an outer peripheral line of the pad region of the second portion 50B and an outer peripheral line of the first portion 50A equals the distance Dy.

Figure 3A:
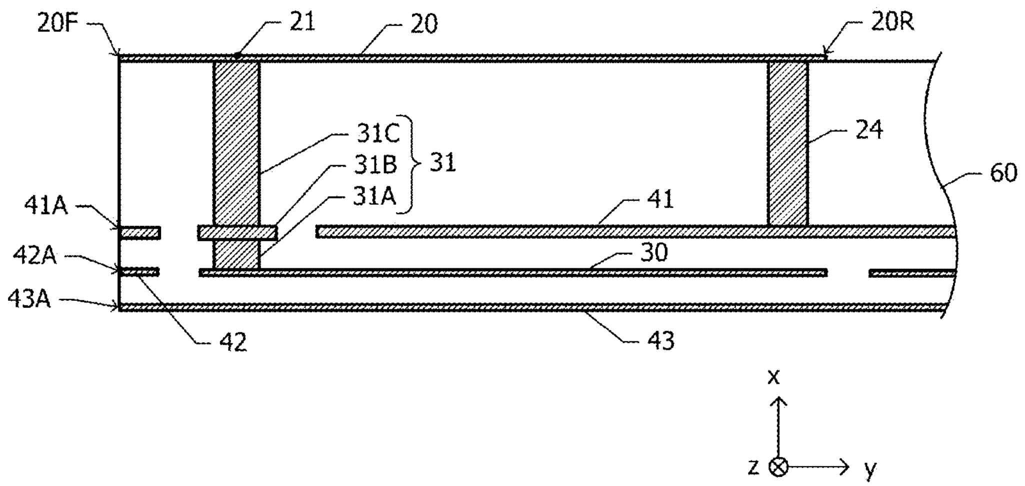
FIG. 3A and FIG. 3B are sectional views taken along a dashed-and-dotted line 3A-3A and a dashed-and-dotted line 3B-3B in FIG. 2, respectively.
Figure 3B:
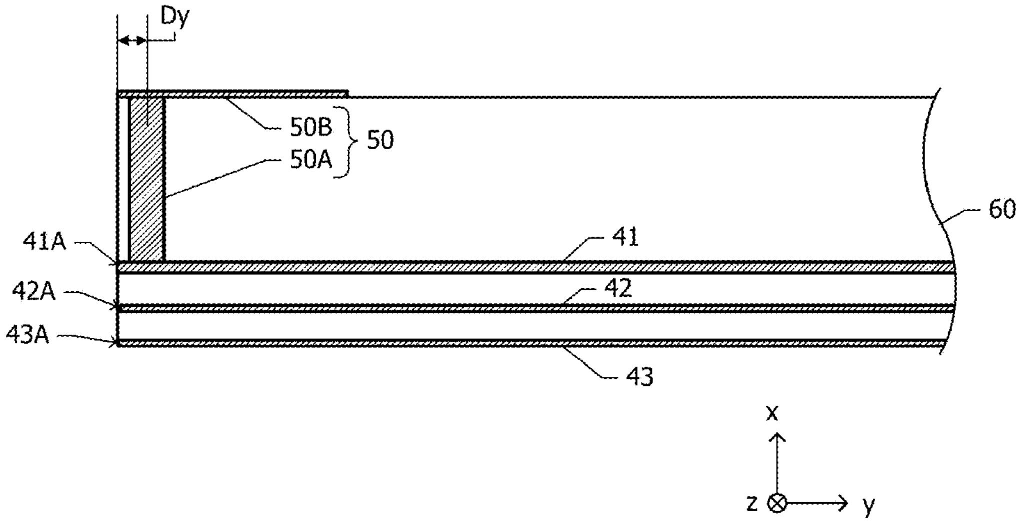

FIG. 3A and FIG. 3B are sectional views taken along a dashed-and-dotted line 3A-3A and a dashed-and-dotted line 3B-3B in FIG. 2, respectively. The radiating element 20 and the second portion 50B of the stub 50 are arranged on an upper surface of a dielectric substrate 60, and the ground plane 43 of the third layer is arranged on a lower surface of the dielectric substrate 60. The ground plane 41 of the first layer is arranged in an inner layer of the dielectric substrate 60. The ground plane 42 of the second layer and the feed line 30 are arranged between the ground plane 41 of the first layer and the ground plane 43 of the third layer. The feed line 30 is arranged in the same layer as the ground plane 42 of the second layer. The feed line 30, the ground plane 41 above the feed line 30, and the ground plane 43 below the feed line 30 form a strip line having a tri-plate structure.

The feed line 30 is connected to the feed point 21 of the radiating element 20 via a conductor member 31 extending in a thickness direction of the dielectric substrate 60. The conductor member 31 includes, for example, an inner layer pad 31B arranged in the same layer as the ground plane 41 and isolated from the ground plane 41, a via 31A connecting the inner layer pad 31B and the feed line 30, and a via 31C connecting the inner layer pad 31B and the radiating element 20. In plan view, the inner layer pad 31B is slightly larger than the via 31A and the via 31C. The difference in size above is set in accordance with the alignment accuracy in a manufacturing process.

The rear edge 20R of the radiating element 20 is short-circuited to the ground plane 41 of the first layer by the short-circuit via 24. Note that a margin depending on the alignment accuracy in a manufacturing process is ensured between the rear edge 20R and a connection position of the short-circuit via 24 and the radiating element 20. The front edge 20F of the radiating element 20 and the first edge 41A of the ground plane 41 are arranged at the same position in the y-direction. Note that the first edge 42A of the ground plane 42 of the second layer and the first edge 43A of the ground plane 43 of the third layer are also arranged at the same position as the front edge 20F with respect to the y-direction.

The second portion 50B of the stub 50 and the ground plane 41 are connected by the first portion 50A. The first portion 50A is arranged slightly inside the first edge 41A of the ground plane 41.

Figure 4:
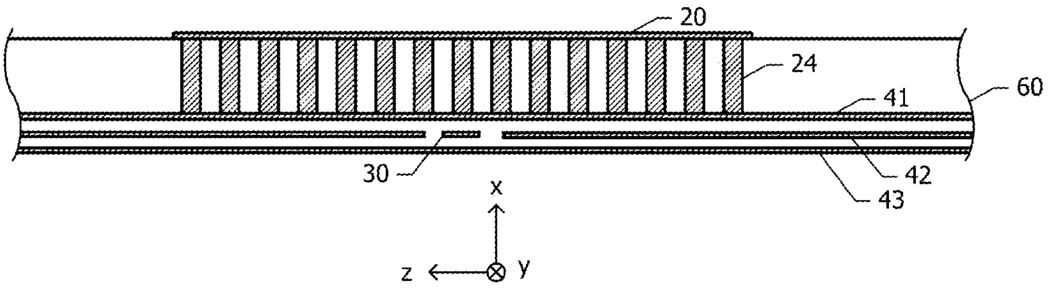
FIG. 4 is a sectional view taken along a dashed-and-dotted line 4-4 in FIG. 2.

FIG. 4 is a sectional view taken along a dashed-and-dotted line 4-4 in FIG. 2. The radiating element 20 is arranged on the upper surface of the dielectric substrate 60, and the ground plane 43 is arranged on the lower surface of the dielectric substrate 60. The radiating element 20 is short-circuited to the ground plane 41 of an inner layer by the multiple short-circuit vias 24. The ground plane 42 and the feed line 30 are arranged between the ground planes 41 and 43.

Next, an excellent effect of the first embodiment will be described with reference to the drawings from FIG. 5A to FIG. 6B.

The distribution of a radio-frequency current flowing through the ground plane 41, when the radiating element 20 was excited at a frequency corresponding to a resonant frequency of the radiating element 20, was obtained by simulation. The resonant frequency of the radiating element 20 is 60 GHz. In the case above, an effective wavelength in consideration of a wavelength shortening effect because of a dielectric constant of the dielectric substrate 60 (hereinafter sometimes referred to as an effective wavelength) is approximately 3.40 mm. Further, unless otherwise specified, the "wavelength corresponding to the resonant frequency" means the "effective wavelength corresponding to the resonant frequency". Note that the resonant frequency of the radiating element 20 is determined by a size of the radiating element 20 in the y-direction, a positional relationship between the radiating element 20 and the first edge 41A of the ground plane 41, a positional relationship between the radiating element 20 and the stub 50, and the like.

Figure 5A:
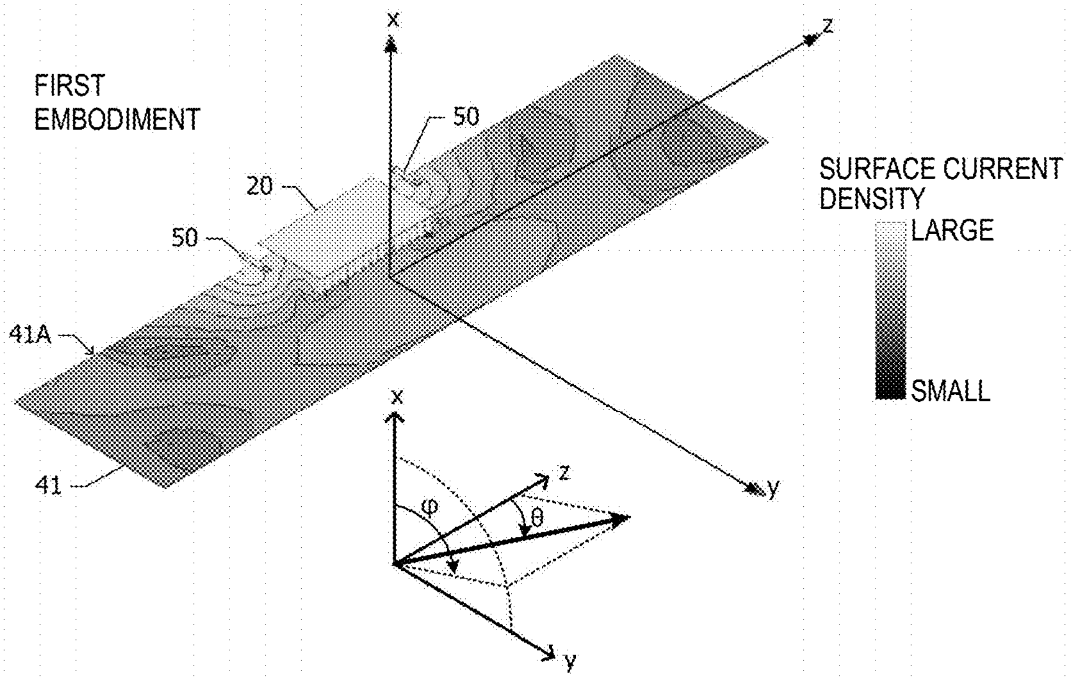
FIG. 5A and FIG. 5B are charts showing a current distribution at a certain point of time of a radio-frequency current flowing through a ground plane of the antenna device according to the first embodiment and an antenna device according to a comparative example, respectively.
Figure 5B:
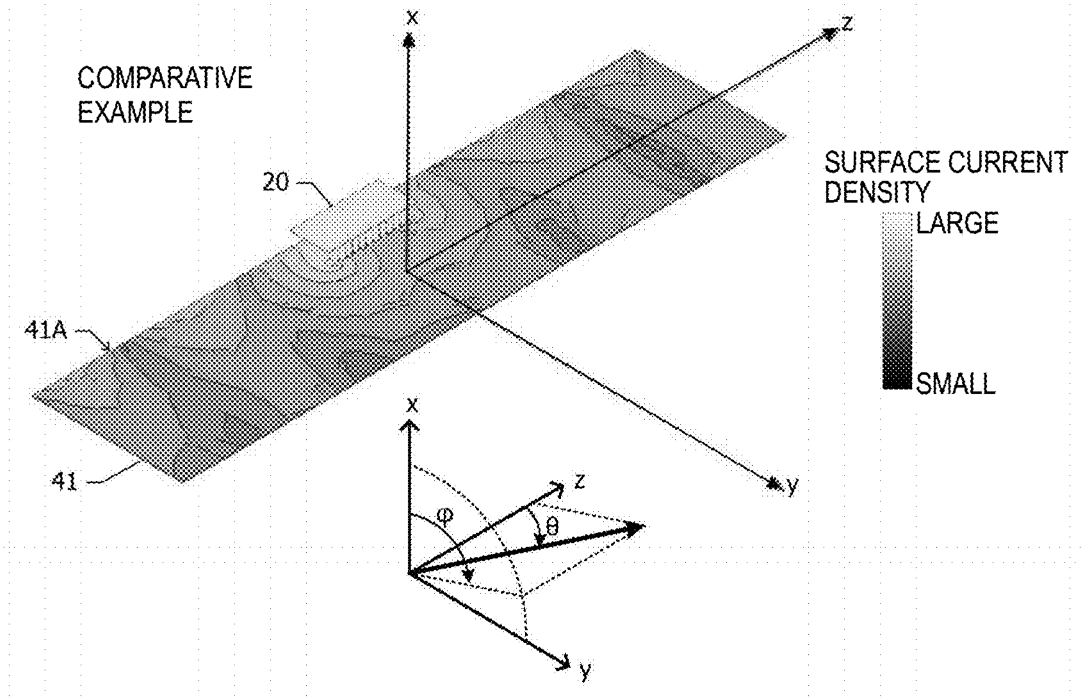

FIG. 5A and FIG. 5B are charts showing a current distribution at a certain moment of a radio-frequency current flowing through the ground plane 41 of the antenna device according to the first embodiment and an antenna device according to a comparative example, respectively. The antenna device according to the comparative example is the same as an antenna device in which the stubs 50 are removed from the antenna device according to the first embodiment. In FIG. 5A and FIG. 5B, a region having a larger surface current density is indicated by a lighter color.

In the antenna device (FIG. 5B) according to the comparative example, a region having a larger surface current density periodically appears in the z-direction at a position of the first edge 41A. When time is proceeded from the point shown in FIG. 5B, the region having a larger surface current density moves in a direction away from the radiating element 20. That is, it was found that a radio-frequency current propagating along the first edge 41A was generated.

Whereas, in the antenna device (FIG. 5A) according to the first embodiment, it can be seen that the current is concentrated in the vicinity of an attachment position of the stub 50. A radio-frequency current is generated in the ground plane 41 right below the radiating element 20 and propagates along the first edge 41A. However, the propagation of the radio-frequency current along the first edge 41A is reduced by being reflected by the stub 50.

Next, beam patterns of the antenna devices according to the first embodiment (FIG. 5A) and the comparative example (FIG. 5B) will be described with reference to FIG. 6A and FIG. 6B.

Figure 6A:
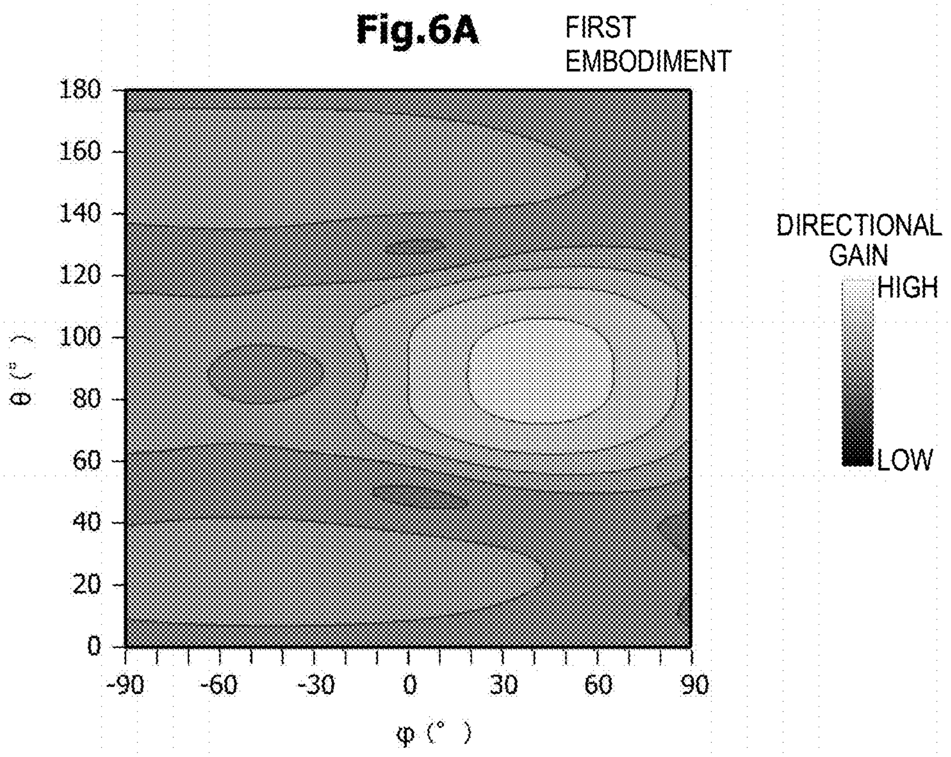
FIG. 6A and FIG. 6B are graphs showing, by shading, an angle dependence of a directional gain of the antenna device according to the first embodiment (FIG. 5A) and the antenna device according to the comparative example (FIG. 5B), respectively.
Figure 6B:
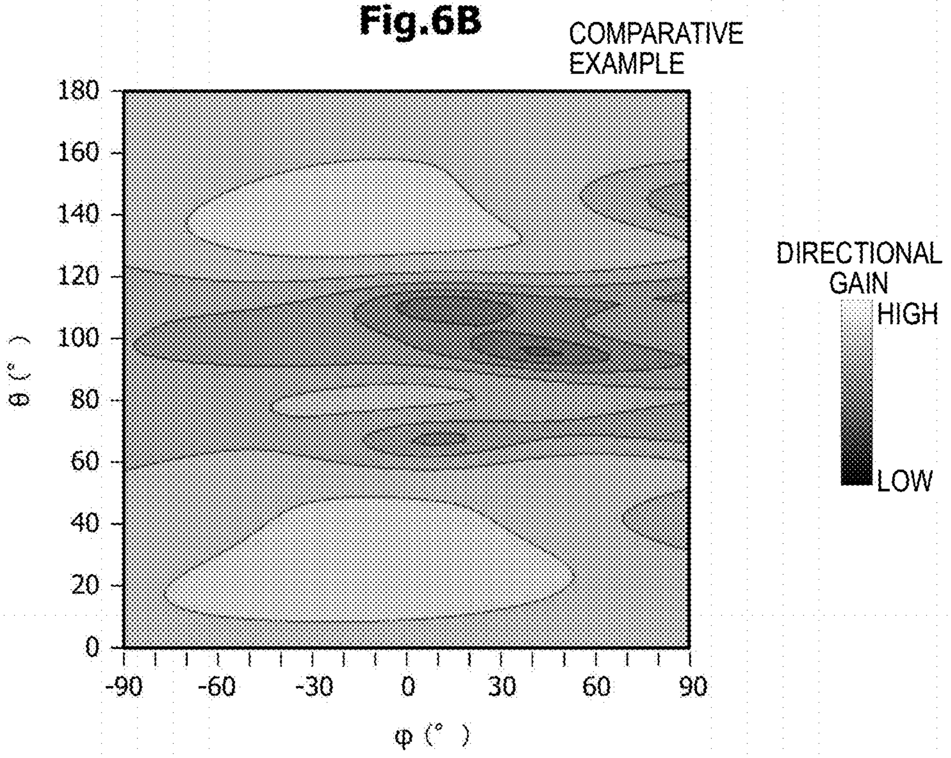

FIG. 6A and FIG. 6B are graphs showing, by shading, an angle dependence of a directional gain of the antenna device according to the first embodiment (FIG. 5A) and the antenna device according to the comparative example (FIG. 5B), respectively. The horizontal axis represents the azimuth angle φ in a unit of "°" (degree), and the vertical axis represents the polar angle θ in a unit of "°" (degree). A region where the directional gain is higher is indicated by a lighter color.

In the antenna device according to the first embodiment, as shown in FIG. 6A, the directional gain is high in a range that the azimuth angle φ is approximately 45°+10° and the polar angle θ is approximately 90°+10°. That is, a main beam is formed in a direction in which the azimuth angle φ is approximately 45° and the polar angle θ is approximately 90°.

Whereas, in the comparative example, as shown in FIG. 6B, ranges in which the directional gain is higher appear in multiple places in a distributed manner. That is, the beam pattern is disordered. Further, when the polar angle θ is fixed to 90° (that is, in the xy plane) and the azimuth angle φ is changed, a clear beam does not appear. The disorder of the beam pattern is caused by the fact that the radio-frequency current propagating along the first edge 41A of the ground plane 41 becomes a new wave source.

In the first embodiment, it is possible to reduce secondary radiation having a wave source of a radio-frequency current propagating along the first edge 41A of the ground plane 41. As a result, it is possible to obtain an excellent effect that the disorder of a beam pattern may be reduced.

Next, a preferable range of the distance Dz (FIG. 2) from the stub 50 to the radiating element 20 in the z-direction will be described with reference to FIG. 7. When the attachment position of the stub 50 to the ground plane 41 is set too far from the radiating element 20, the effect of providing the stub 50 is reduced. That is because the distance over which a radio-frequency current may propagate from the radiating element 20 to the stub 50 increases. Further, when the stub 50 is placed too close to the radiating element 20, the ground plane 41 in a region farther than the stub 50, seen from the radiating element 20, is coupled to the radiating element 20. This causes a radio-frequency current to be generated. Since the stub 50 is not arranged on a path along which the radio-frequency current propagates in a direction away from the radiating element 20, the radio-frequency current propagates along the first edge 41A. Accordingly, it is considered that there is a preferable range for the distance Dz.

Figure 7:
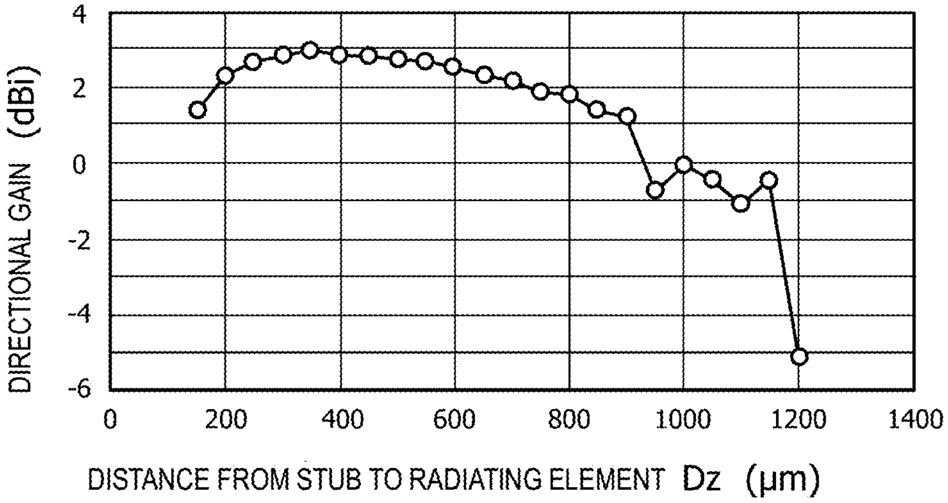
FIG. 7 is a graph showing a relationship between a distance Dz and a directional gain of an antenna device in a direction of θ=90° and θ=90°.

FIG. 7 is a graph showing a relationship between the distance Dz, and the directional gain of the antenna device in the direction of θ=90° and φ=90° (that is, positive direction of y-axis). The horizontal axis represents the distance Dz in a unit of "μm", and the vertical axis represents the directional gain in a unit of "dBi". The effective wavelength corresponding to the resonant frequency of the radiating element 20 is approximately 3.40 mm. From the graph shown in FIG. 7, it can be seen that a high directional gain is obtained by setting the distance Dz to 1/15 or more and 1/4 or less of the effective wavelength.

Next, a preferable range of a length of the stub 50 will be described with reference to FIG. 8. Here, the length of the stub 50 corresponds to a total length of a size of the first portion 50A in the x-direction and a size of the second portion 50B in the y-direction.

Figure 8:
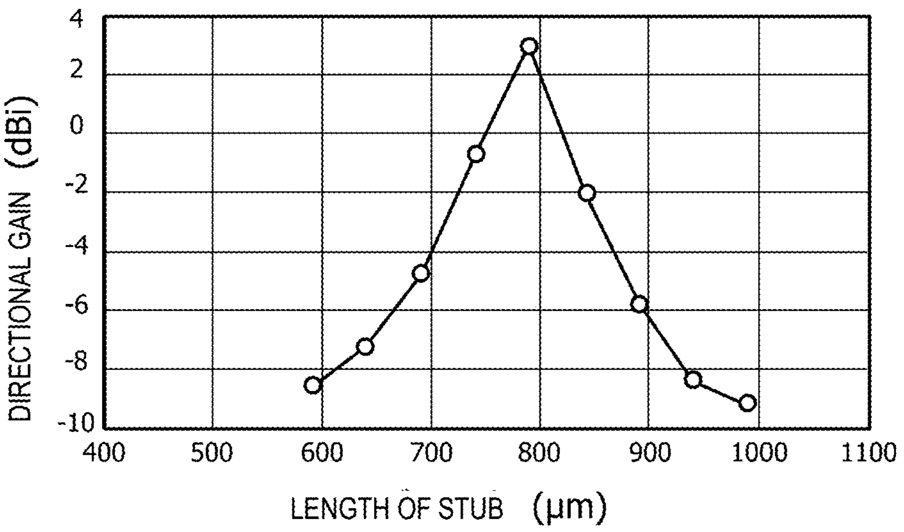
FIG. 8 is a graph showing a relationship between a length of a stub and a directional gain of an antenna device in the direction of θ=90° and θ=90°.

FIG. 8 is a graph showing a relationship between the length of the stub 50, and the directional gain of the antenna device in the direction of θ=90° and φ=90° (that is, positive direction of y-axis). The horizontal axis represents the length of the stub 50 in a unit of "μm", and the vertical axis represents the directional gain in a unit of "dBi". It can be seen that a high directional gain may be obtained by setting the length of the stub 50 in a range of 21% or more and 25% or less of the effective wavelength.

Next, a preferable range of the distance Dy (FIG. 2) from the connection position of the stub 50 and the ground plane 41 to the first edge 41A will be described. In order to prevent the propagation of a radio-frequency current along the first edge 41A, it is preferable to bring the connection position of the stub 50 close to the first edge 41A. Referring to FIG. 5B, it can be seen that, in a region away from the radiating element 20 along the first edge 41A, a sufficiently large surface current flows even at a position away from the first edge 41A to inside the ground plane 41 by ¼ of the effective wavelength corresponding to the resonant frequency of the radiating element 20. Accordingly, it is considered that, when the distance Dy from the connection position of the stub 50 and the ground plane 41 to the first edge 41A is ¼ or less of the effective wavelength corresponding to the resonant frequency of the radiating element 20, a sufficient effect of preventing the propagation of a radio-frequency current along the first edge 41A may be obtained.

Next, a modification of the first embodiment will be described with reference to FIG. 9.

Figure 9:
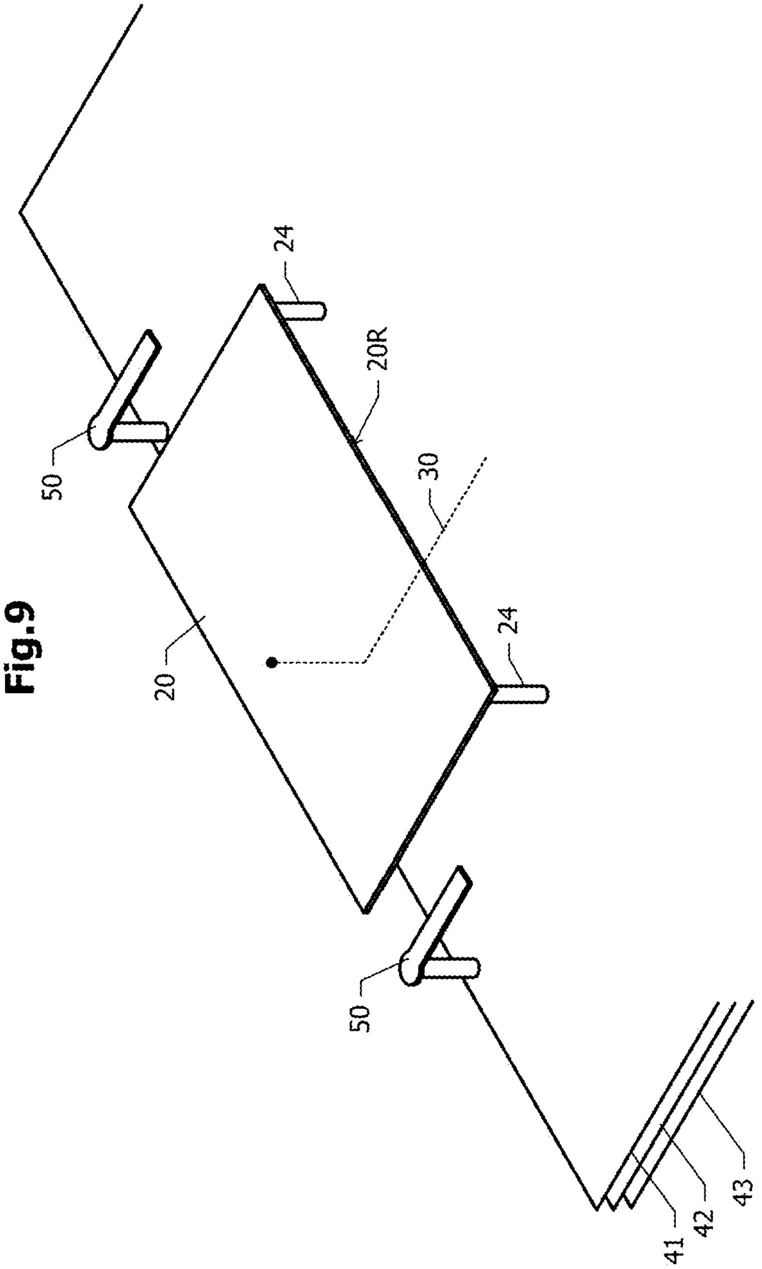
FIG. 9 is a perspective view of an antenna device according to a modification of the first embodiment illustrating a conductor portion thereof.

FIG. 9 is a perspective view of an antenna device according to the modification of the first embodiment illustrating a conductor portion thereof. In the first embodiment (FIG. 1), the multiple short-circuit vias 24 are arranged along the rear edge 20R of the radiating element 20. Whereas, in the present modification, the short-circuit vias 24 are arranged at respective ends of the rear edge 20R of the radiating element 20. The short-circuit via 24 is not arranged at a position other than the both ends of the rear edge 20R. In the present modification as well, the radiating element 20 and the ground plane 41 work as a half patch antenna. As described above, the number and arrangement of the short-circuit vias 24 may be determined under the condition that the radiating element 20 and the ground plane 41 work as a half patch antenna.

Next, another modification of the first embodiment will be described with reference to FIG. 10.

Figure 10:
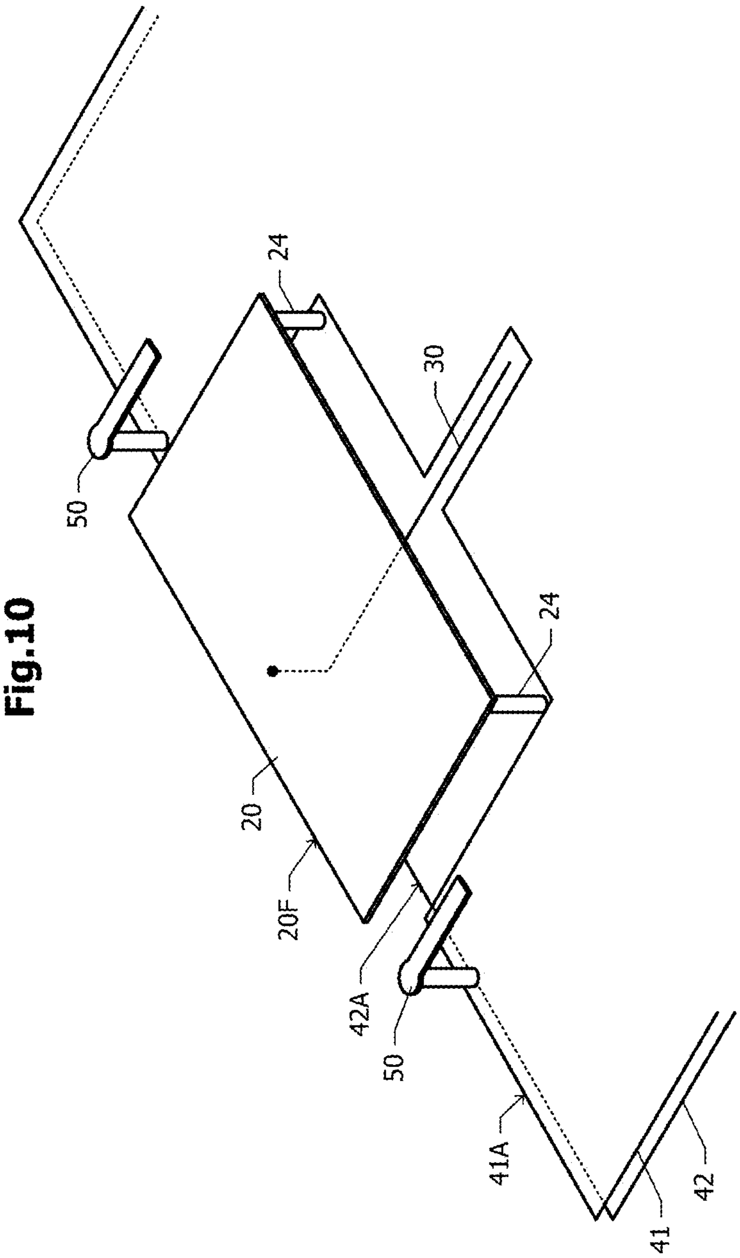
FIG. 10 is a perspective view of an antenna device according to another modification of the first embodiment illustrating a conductor portion thereof.

FIG. 10 is a perspective view of a conductor portion of an antenna device according to the other modification of the first embodiment. In the first embodiment (FIG. 1), the radiating element 20 is included in the ground plane 41 of the first layer in plan view. Whereas, the ground plane 41 of the first layer of the antenna device according to the present modification has a shape obtained by removing a portion, of the ground plane 41 (FIG. 1) of the first layer of the antenna device according to the first embodiment, that overlaps the radiating element 20.

Therefore, the first edge 41A of the ground plane 41 does not overlap the front edge 20F of the radiating element 20 in plan view. However, an extension line of the first edge 41A and the front edge 20F overlap each other in plan view.

Further, in the first embodiment (FIG. 4), the feed line 30 is arranged in the same layer as the ground plane 42 of the second layer. Whereas, in the present modification, the feed line 30 is arranged in the same layer as the ground plane 41 of the first layer, and a gap portion in which a metal film is removed is ensured between the feed line 30 and the ground plane 41.

The ground plane 42 of the second layer includes the radiating element 20 in plan view. Part of the first edge 42A of the ground plane 42 coincides with the front edge 20F of the radiating element 20 in plan view. The radiating element 20 is short-circuited to the ground plane 42 of the second layer by the short-circuit vias 24 provided at both ends of the rear edge 20R.

In the present modification, the ground plane 42 of the second layer is provided on the lower surface of the dielectric substrate, and the ground plane of the third layer is not provided.

In the present modification, the vicinity of an end portion of the first edge 41A of the ground plane 41 of the first layer, which is close to the radiating element 20, is coupled to the radiating element 20. This makes a radio-frequency current that propagates along the first edge 41A be generated. The stub 50 reduces the propagation of a radio-frequency current along the first edge 41A. Further, a radio-frequency current, along the first edge 42A of the ground plane 42 of the second layer, is generated as well. The stub 50 is connected to the ground plane 42 of the second layer as well, at the same position as the connection position to the ground plane 41 of the first layer. Therefore, the stub 50 also reduces the propagation of a radio-frequency current along the first edge 42A of the ground plane 42 of the second layer. As a result, the disorder of a beam pattern may be reduced.

As in the modification illustrated in FIG. 10, a configuration is acceptable in which the ground plane 41 of the first layer does not overlap the radiating element 20 in plan view.

Next, still another modification of the first embodiment will be described.

Although a half patch antenna is configured of the radiating element 20 and the ground plane 41 in the first embodiment, a normal patch antenna may be configured. A normal patch antenna is configured by removing the short-circuit vias 24 from the antenna device according to the first embodiment and by increasing the size of the radiating element 20 in the y-direction to twice the size of the radiating element 20 of the half patch antenna.

Although the shape of the radiating element 20 in plan view is a rectangle in the first embodiment, the radiating element 20 may have another shape capable of working as a patch antenna or a half patch antenna. For example, four corners of the rectangle may be cut off with a square shape or a rectangular shape.

Second Embodiment

Next, an antenna device according to a second embodiment will be described with reference to FIG. 11 and FIG. 12. Hereinafter, a description of the configuration common to that of the antenna device according to the first embodiment (drawings from FIG. 1 to FIG. 4) will be omitted.

Figure 11:
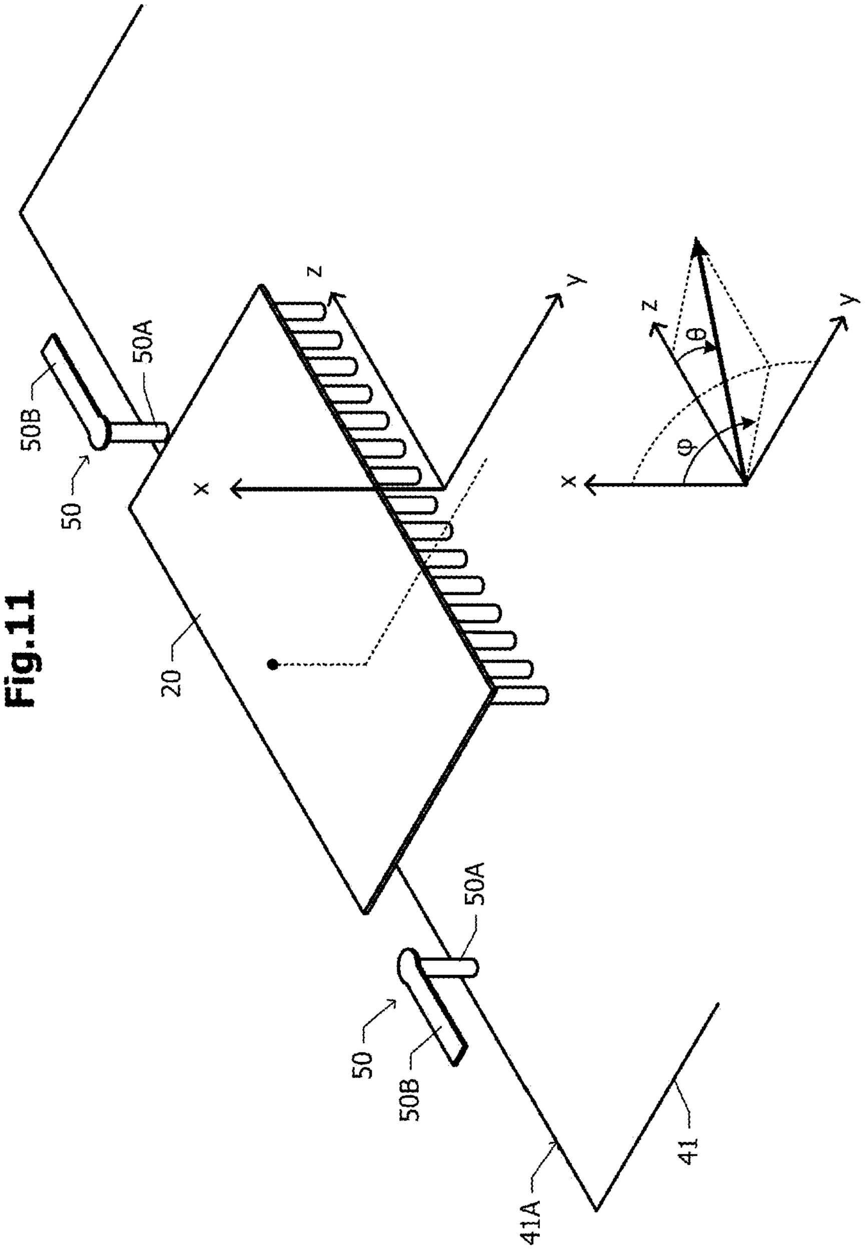
FIG. 11 is a perspective view of an antenna device according to a second embodiment illustrating a metal portion thereof.

FIG. 11 is a perspective view of the antenna device according to the second embodiment illustrating a metal portion thereof. In the first embodiment, the second portion 50B of the stub 50 extends from the tip end of the first portion 50A in the positive direction of the y-axis. Whereas, in the second embodiment, the second portion 50B of the stub 50 extends from the tip end of the first portion 50A in a direction parallel to the first edge 41A and away from the radiating element 20.

Figure 12:
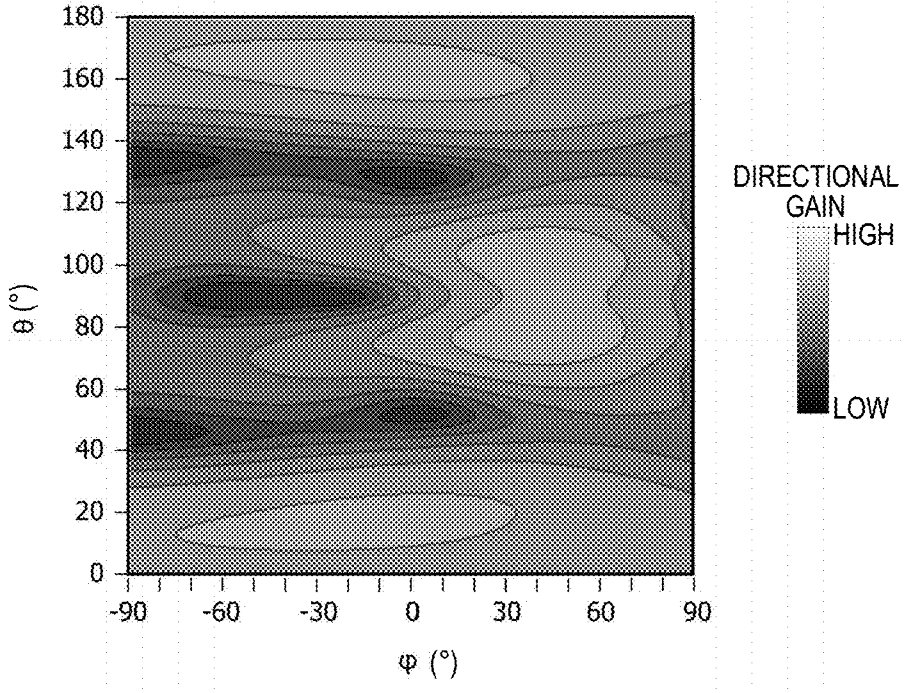
FIG. 12 is a graph showing, by shading, an angle dependence of a directional gain of the antenna device according to the second embodiment.

FIG. 12 is a graph showing, by shading, an angle dependence of a directional gain of the antenna device according to the second embodiment. The horizontal axis represents the azimuth angle φ in a unit of "°" (degree), and the vertical axis represents the polar angle θ in a unit of "°" (degree). A region where the directional gain is higher is indicated by a lighter color. In the second embodiment as well, in the same way as the antenna device (FIG. 6A) according to the first embodiment, the directional gain is large in a range of the polar angle θ=90°, that is, in the xy plane, and the azimuth angle φ is approximately 45°+10°. Further, it can be seen that the disorder of a beam pattern is reduced as compared with the beam pattern of the antenna device according to the comparative example shown in FIG. 6B.

Third Embodiment

Next, an antenna device according to a third embodiment will be described with reference to FIG. 13 and FIG. 14. Hereinafter, a description of the configuration common to that of the antenna device according to the first embodiment (drawings from FIG. 1 to FIG. 4) will be omitted.

Figure 13:
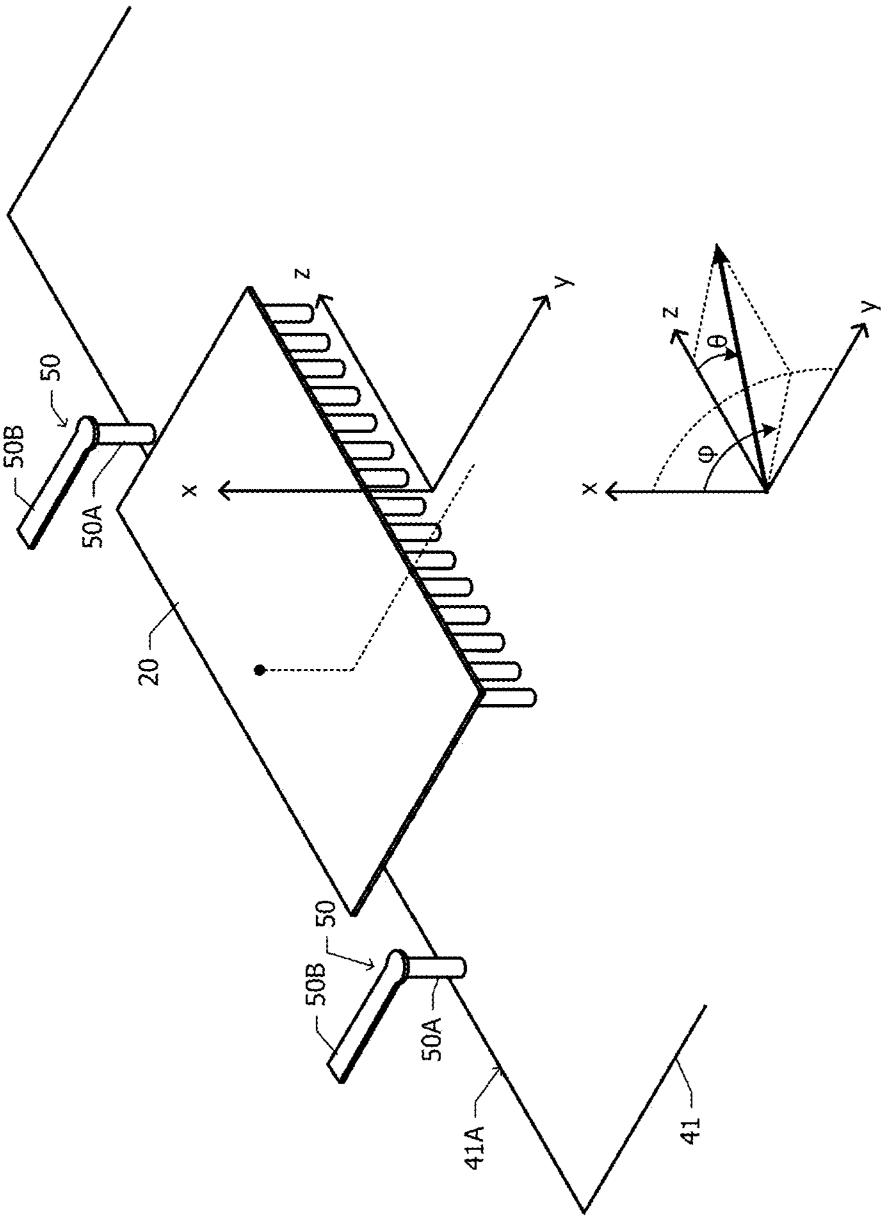
FIG. 13 is a perspective view of an antenna device according to a third embodiment illustrating a metal portion thereof.

FIG. 13 is a perspective view of the antenna device according to the third embodiment illustrating a metal portion thereof. In the first embodiment, the second portion 50B of the stub 50 extends from the tip end of the first portion 50A in the positive direction of the y-axis. Whereas, in the third embodiment, the second portion 50B of the stub 50 extends from the tip end of the first portion 50A in a negative direction of the y-axis.

Figure 14:
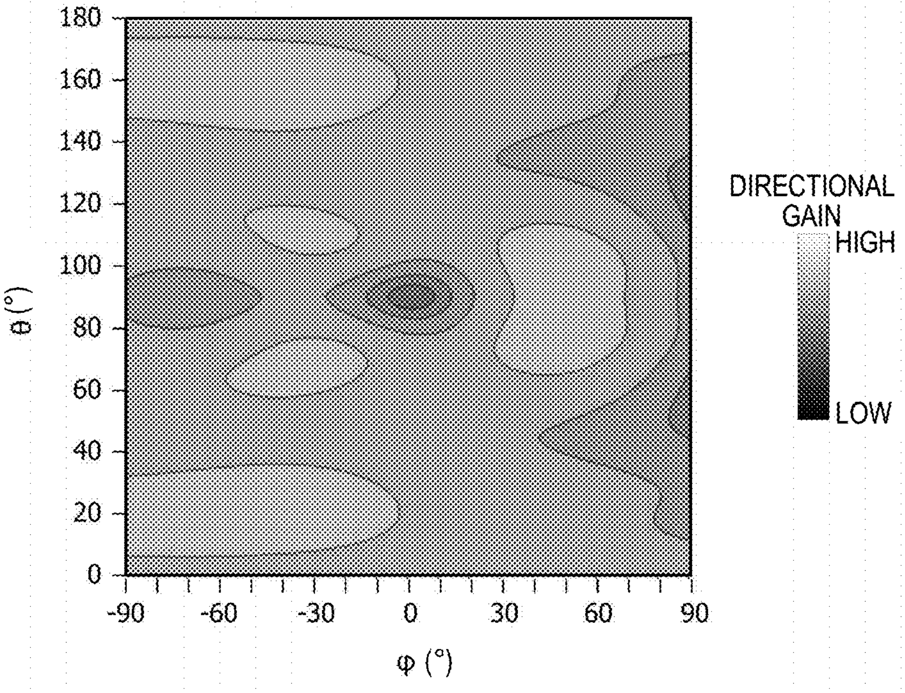
FIG. 14 is a graph showing, by shading, an angle dependence of a directional gain of the antenna device according to the third embodiment.

FIG. 14 is a graph showing, by shading, an angle dependence of a directional gain of the antenna device according to the third embodiment. The horizontal axis represents the azimuth angle φ in a unit of "°" (degree), and the vertical axis represents the polar angle θ in a unit of "°" (degree). A region where the directional gain is higher is indicated by a lighter color. In the second embodiment as well, in the same way as the antenna device (FIG. 6A) according to the first embodiment, the directional gain is large in a range of the polar angle θ=90°, that is, in the xy plane, and the azimuth angle φ is approximately 45°±10°. Further, it can be seen that the disorder of a beam pattern is reduced as compared with the beam pattern of the antenna device according to the comparative example shown in FIG. 6B.

As described in the first to third embodiments, the direction in which the second portion 50B (FIG. 1, FIG. 11, and FIG. 13) of the stub 50 extends is not particularly limited. Note that, in the second embodiment, as shown in FIG. 12, a region having a directional gain similar to that of a main beam is generated in a range that the polar angles θ are approximately 10° and approximately 170°, and the azimuth angle φ is −70° or more and 30° or less. In the third embodiment, as shown in FIG. 14, four regions having a directional gain similar to that of the main beam are generated. In order to improve the directivity, it is preferable that the second portion 50B of the stub 50 extend from the tip end of the first portion 50A in the positive direction of the y-axis as in the first embodiment.

Further, when changed is the direction in which the second portion 50B of the stub 50 extends, input impedance of an antenna device changes. By appropriately designing the direction in which the second portion 50B extends, impedance matching of the antenna device may become possible.

Fourth Embodiment

Next, an antenna device according to a fourth embodiment will be described with reference to FIG. 15. Hereinafter, a description of the configuration common to that of the antenna device according to the first embodiment (drawings from FIG. 1 to FIG. 4) will be omitted.

Figure 15:
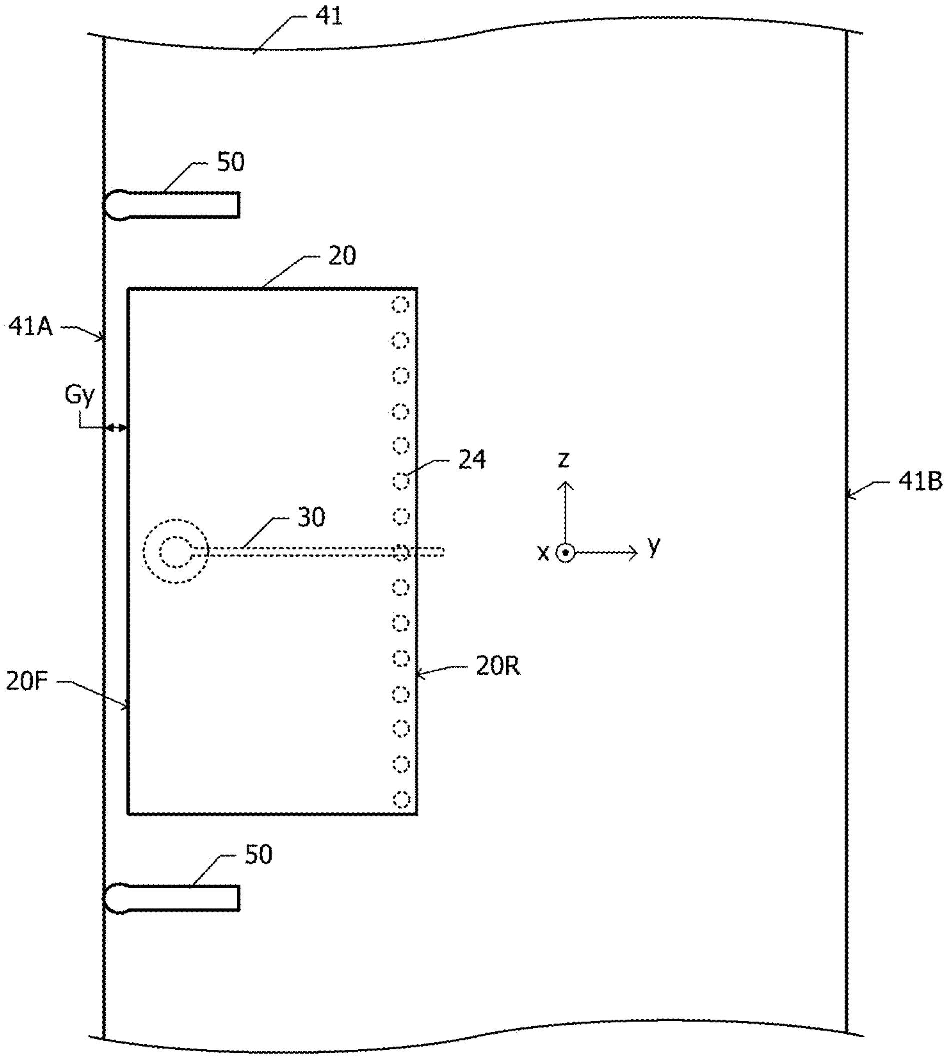
FIG. 15 is a plan view of an antenna device according to a fourth embodiment.

FIG. 15 is a plan view of the antenna device according to the fourth embodiment. In the first embodiment (FIG. 2), the front edge 20F of the radiating element 20 is made to coincide with part of the first edge 41A of the ground plane 41 in plan view. Whereas, in the fourth embodiment, the front edge 20F of the radiating element 20 is arranged at a position recessed from the first edge 41A toward the second edge 41B in plan view. A distance between the first edge 41A and the front edge 20F in the y-direction is denoted by Gy. The distance Gy may be defined as a distance from the first edge 41A to the radiating element 20 in the y-direction. The distance from the rear edge 20R of the radiating element 20 to the second edge 41B of the ground plane 41 in the y-direction is longer than the distance Gy. That is, in plan view, the radiating element 20 is arranged at a position biased to a side of the first edge 41A with respect to the ground plane 41.

Even when the front edge 20F of the radiating element 20 is arranged at a position recessed from the first edge 41A of the ground plane 41 in plan view, the ground plane 41 is coupled to the radiating element 20. This makes a radio-frequency current that propagates along the first edge 41A be generated.

When the distance Gy becomes longer, a radio-frequency current propagating along the first edge 41A becomes smaller, and the disorder of a beam pattern of the antenna device hardly occurs. In the case above, it is not necessary to provide the stub 50. When the distance Gy is ¼ or less of the effective wavelength corresponding to the resonant frequency of the radiating element 20, the disorder of a beam pattern due to a radio-frequency current propagating along the first edge 41A can hardly be ignored. Accordingly, when the distance Gy is ¼ or less of the effective wavelength corresponding to the resonant frequency of the radiating element 20, a significant effect for providing the stub 50 is obtained.

Fifth Embodiment

Next, an antenna device according to a fifth embodiment will be described with reference to FIG. 16. Hereinafter, a description of the configuration common to that of the antenna device according to the first embodiment (drawings from FIG. 1 to FIG. 4) will be omitted.

Figure 16:
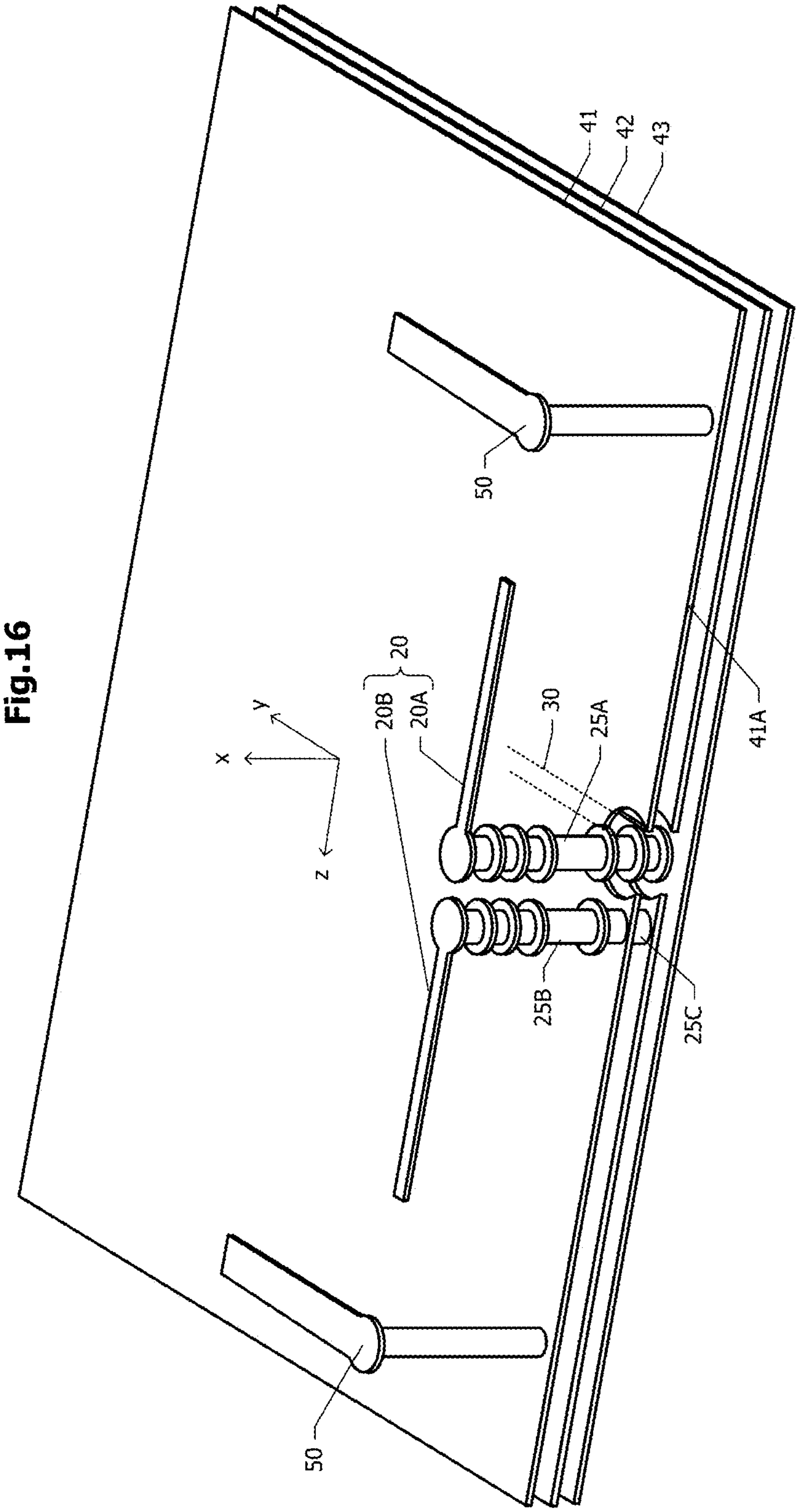
FIG. 16 is a perspective view of an antenna device according to a fifth embodiment illustrating a metal portion thereof.

FIG. 16 is a perspective view of the antenna device according to the fifth embodiment illustrating a metal portion thereof. In the first embodiment, the radiating element 20 and the ground plane 41 (FIG. 1) configure a half patch antenna. Whereas, in the fifth embodiment, the radiating element 20 includes two linear conductors 20A and 20B arranged parallel to the first edge 41A, and works as a dipole antenna.

One of the linear conductors, which is the linear conductor 20A, is connected to the feed line 30 through a via 25A. The other of the linear conductors, which is the linear conductor 20B, is connected to the ground plane 41 through a via 25B and is further connected to the ground plane 42 of the second layer through a via 25C arranged right below the via 25B. Each of the vias 25A and 25B is configured of, for example, multiple inner layer pads and multiple vias connecting the upper and lower inner layer pads to each other.

The stubs 50 are arranged at respective positions sandwiching the radiating element 20 in the z-direction. The configuration of the stub 50 is the same as that of the stub 50 (FIG. 1 and FIG. 3B) of the antenna device according to the first embodiment. In plan view, a distance from each of the two linear conductors 20A and 20B to the first edge 41A of the ground plane 41 in the y-direction is ¼ or less of the effective wavelength corresponding to the resonant frequency of the radiating element 20 working as a dipole antenna.

Next, an excellent effect of the fifth embodiment will be described.

In the fifth embodiment as well, the ground plane 41 is coupled to the radiating element 20 working as a dipole antenna, and a radio-frequency current propagating along the first edge 41A is generated. Since the stub 50 reduces the propagation of a radio-frequency current along the first edge 41A, the disorder of a beam pattern may be reduced.

Sixth Embodiment

Next, an antenna device according to a sixth embodiment will be described with reference to FIG. 17. Hereinafter, a description of the configuration common to that of the antenna device according to the first embodiment described with reference to FIG. 1 to FIG. 8 will be omitted.

Figure 17:
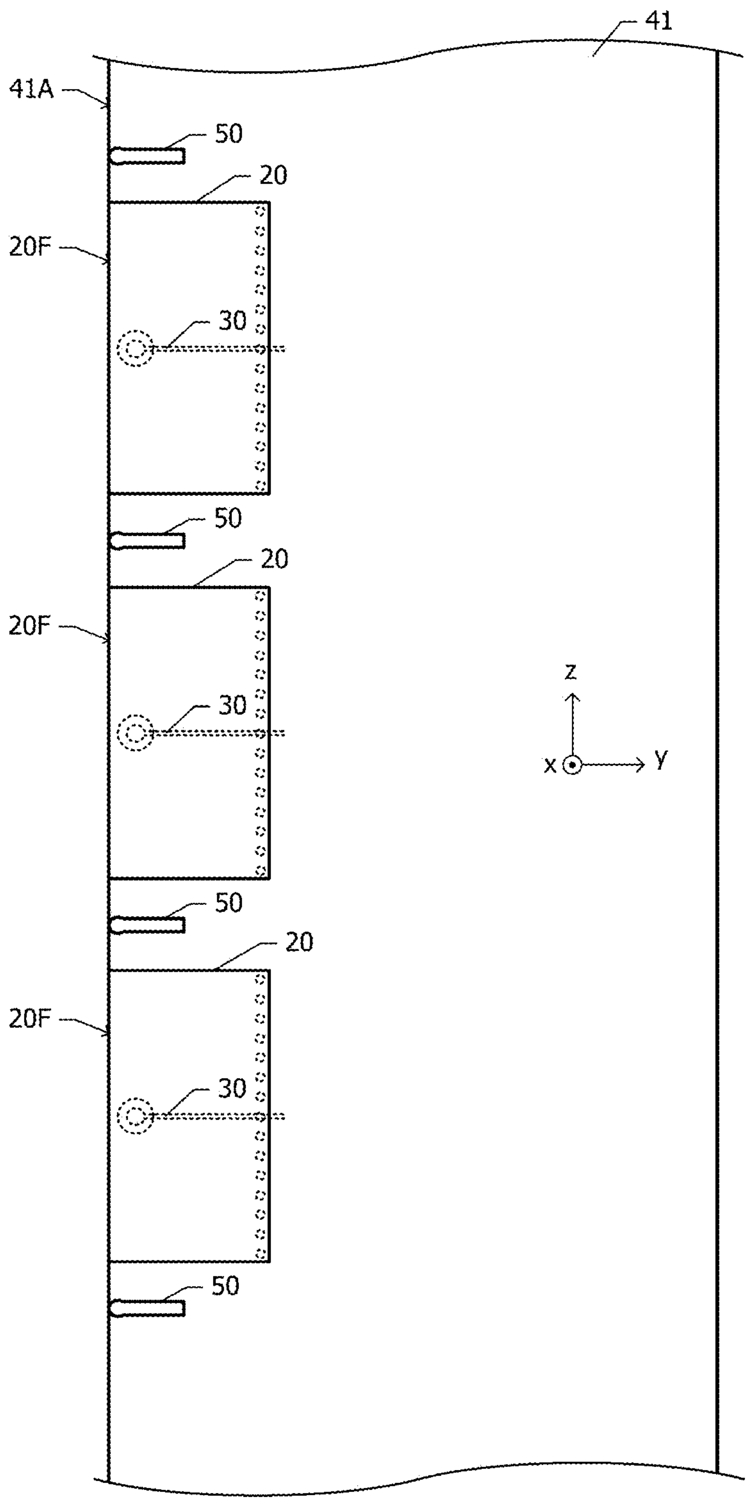
FIG. 17 is a plan view of an antenna device according to a sixth embodiment illustrating a conductor portion thereof.

FIG. 17 is a plan view of the antenna device according to the sixth embodiment illustrating a conductor portion thereof. The antenna device according to the first embodiment has one radiating element 20. Whereas, in the antenna device according to the sixth embodiment, multiple radiating elements 20, each having the same structure as that of the radiating element 20 according to the first embodiment, are arranged side by side in the z-direction. The feed line 30 is connected to each of the radiating elements 20. A common ground plane 41 is arranged for the multiple radiating elements 20. The multiple radiating elements 20 and the ground plane 41 configure an array antenna. A positional relationship between each of the multiple radiating elements 20 and the first edge 41A of the ground plane 41 is the same as the positional relationship between the radiating element 20 and the first edge 41A of the ground plane 41 of the antenna device according to the first embodiment.

The stubs 50 are arranged on both sides of each of the multiple radiating elements 20 in the z-direction. Note that one stub 50 is arranged between two radiating elements 20 adjacent to each other in the z-direction, and the one stub 50 is shared by the radiating elements 20 on both sides. A positional relationship between each of the multiple radiating elements 20 and the stubs 50 on both sides thereof is the same as the positional relationship between the radiating element 20 and the stubs 50 on both sides thereof in the antenna device according to the first embodiment. Further, a positional relationship between each of the stubs 50 and the first edge 41A of the ground plane 41 is the same as a positional relationship between the stub 50 and the first edge 41A of the ground plane 41 of the antenna device according to the first embodiment.

Next, an excellent effect of the sixth embodiment will be described.

In the sixth embodiment, as well as in the first embodiment, the disorder of a beam pattern of each of the radiating elements 20 may be reduced. Therefore, even in an array antenna including the multiple radiating elements 20, the disorder of a beam pattern may be reduced.

Further, arranging one stub 50 between two radiating elements 20 adjacent to each other in the z-direction and sharing the one stub 50 by the two radiating elements 20 make it possible to arrange the radiating elements 20 closer to each other, in comparison with a configuration in which the stubs 50 are individually arranged for the radiating element 20. Therefore, the degree of freedom in setting an interval between the radiating elements 20 is increased.

Seventh Embodiment

Next, an antenna device according to a seventh embodiment will be described with reference to FIG. 18. Hereinafter, a description of the configuration common to that of the antenna device according to the fourth embodiment (FIG. 15) will be omitted.

Figure 18:
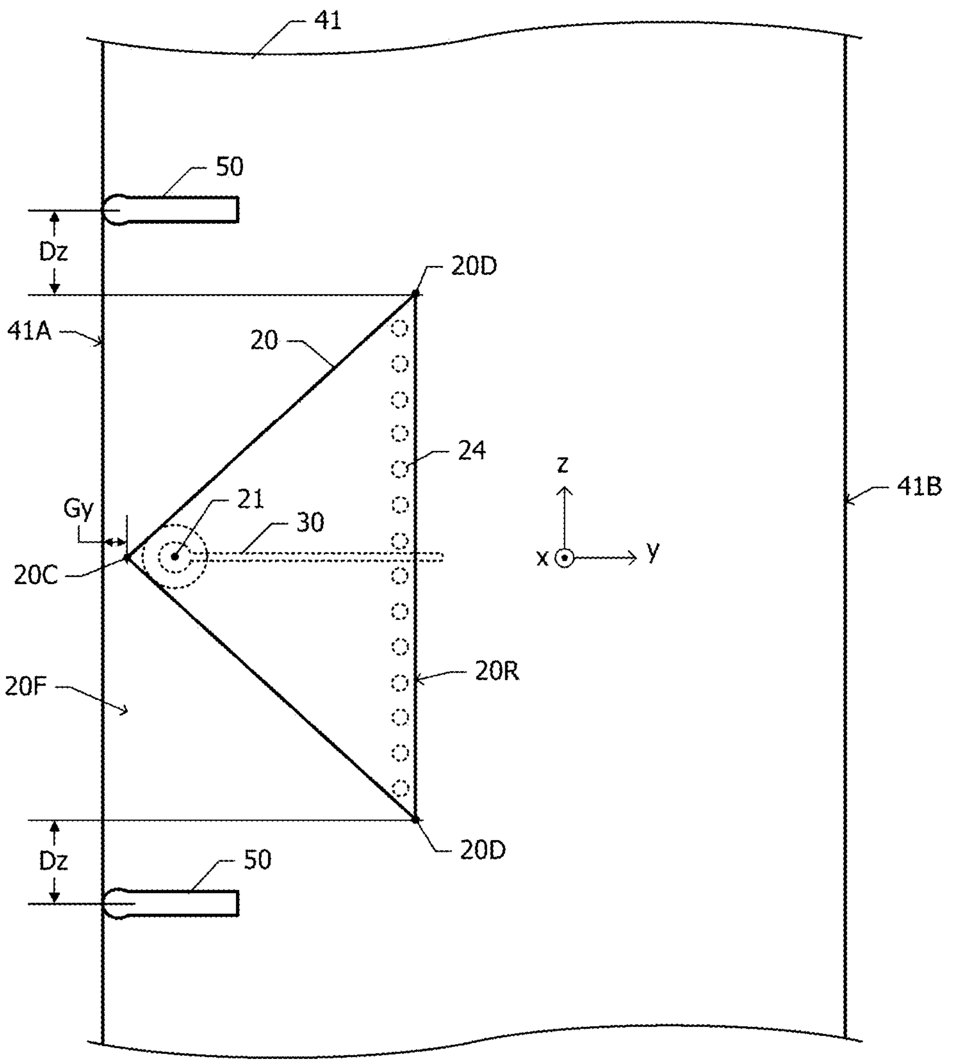
FIG. 18 is a plan view of an antenna device according to a seventh embodiment.

FIG. 18 is a plan view of the antenna device according to the seventh embodiment. In the fourth embodiment (FIG. 15), the radiating element 20 is a rectangle in plan view. Whereas, in the seventh embodiment, the radiating element 20 is a triangle, for example, an isosceles triangle. A base of the isosceles triangle is parallel to the first edge 41A of the ground plane 41 in plan view, and corresponds to the rear edge 20R of the radiating element 20.

The feed point 21 is arranged on a perpendicular line extending from a vertex 20C to the rear edge 20R. Among three vertexes of the radiating element 20, the vertex 20C shared by two equal sides is closest to the feed point 21. The vertex 20C shared by the two equal sides of the isosceles triangle faces the first edge 41A in plan view. A distance Gy in the y-direction from the radiating element 20 to the first edge 41A is equal to a distance from the first edge 41A to the vertex 20C in the y-direction.

A distance Dz, from the center of the connection position of the stub 50 and the ground plane 41 to the radiating element 20 in the z-direction, is defined by an interval in the z-direction between one of vertexes 20D at both ends of the base of the isosceles triangle, and the center of the connection position of the stub 50 and the ground plane 41.

As in the seventh embodiment, even when the planar shape of the radiating element 20 is an isosceles triangle, the radiating element 20 works as a half patch antenna. In the case above, the resonant frequency of the radiating element 20 is determined by the size of the radiating element 20 in the y-direction, the positional relationship between the radiating element 20 and the first edge 41A of the ground plane 41, the positional relationship between the radiating element 20 and the stub 50, and the like.

Next, an excellent effect of the seventh embodiment will be described.

In the seventh embodiment, as well as in the fourth embodiment, when the distance Gy is ¼ or less of the effective wavelength corresponding to the resonant frequency of the radiating element 20, a significant effect for providing the stub 50 is obtained.

Next, an antenna device according to a modification of the seventh embodiment will be described with reference to FIG. 19.

Figure 19:
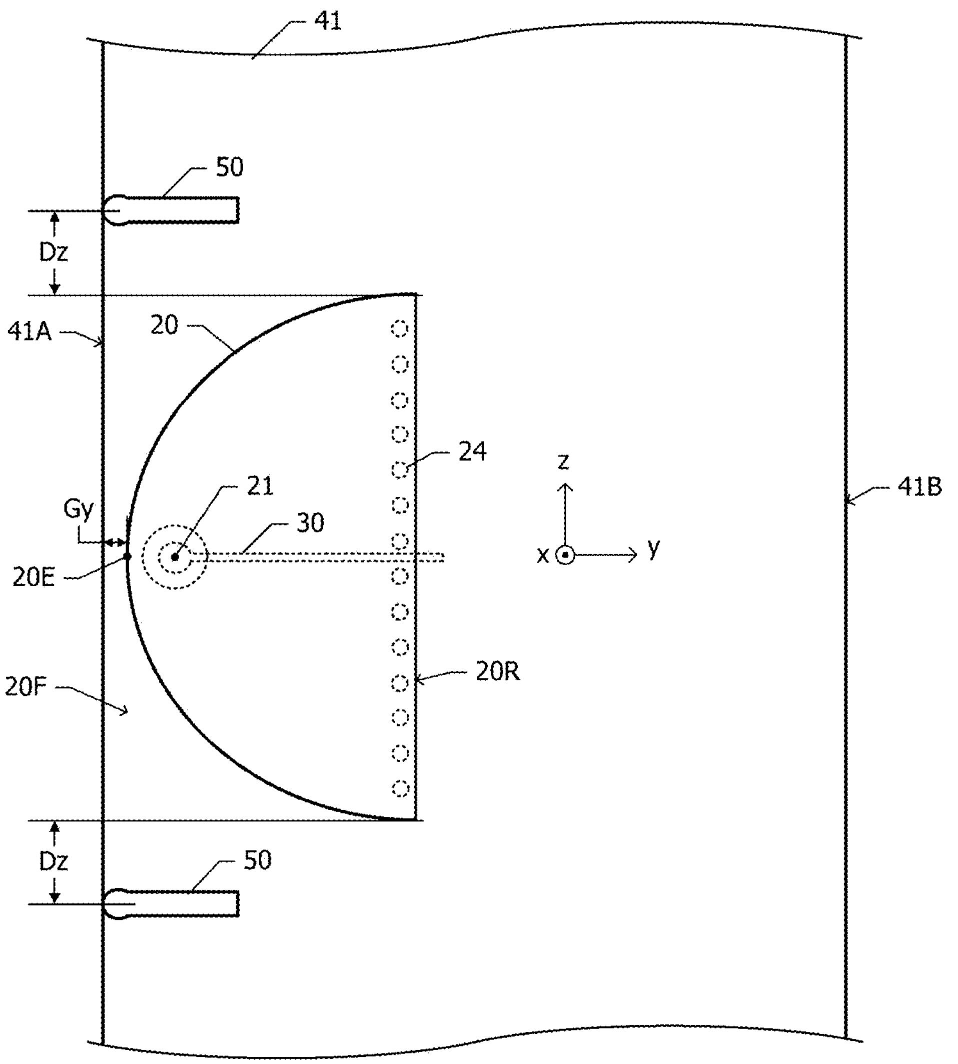
FIG. 19 is a plan view of an antenna device according to a modification of the seventh embodiment.

FIG. 19 is a plan view of the antenna device according to the modification of the seventh embodiment. Although the shape of the radiating element 20 in plan view is an isosceles triangle in the seventh embodiment, in the present modification, the shape of the radiating element 20 in plan view is a semicircle. An edge corresponding to a diameter of the semicircle corresponds to the rear edge 20R.

A distance Gy from the radiating element 20 to the first edge 41A in the y-direction is equal to a distance from an intersection 20E, of a perpendicular bisector of the rear edge 20R and a circumference of the semicircle, to the first edge 41A in the y-direction. The feed point 21 is positioned on a radius passing through the intersection 20E.

As in the present modification, the shape of the radiating element 20 in plan view may be a semicircle. In addition, the shape of the radiating element 20 in plan view may be a shape obtained by dividing an ellipse in half by a major axis or a minor axis.

The above-described embodiments are merely examples, and it is needless to say that partial replacement or combination of configurations described in different embodiments is possible. Similar functions and effects obtained by similar configurations of multiple embodiments will not be described for each embodiment. Furthermore, the present invention is not limited to the embodiments described above. For example, it will be apparent to those skilled in the art that various modifications, improvements, combinations, and the like can be made.

REFERENCE SIGNS LIST

20 RADIATING ELEMENT

20A, 20B LINEAR CONDUCTOR

20C VERTEX SHARED BY TWO EQUAL SIDES OF ISOSCELES TRIANGULAR RADIATING ELEMENT
20D VERTEX AT BOTH ENDS OF BASE OF ISOSCELES TRIANGULAR RADIATING ELEMENT
20E INTERSECTION OF PERPENDICULAR BISECTOR OF REAR EDGE AND CIRCUMFERENCE OF SEMICIRCULAR RADIATING ELEMENT
20F FRONT EDGE
20R REAR EDGE
21 FEED POINT
24 SHORT-CIRCUIT VIA
25A, 25B, 25C VIA
30 FEED LINE
31 CONDUCTOR MEMBER
31A VIA
31B INNER LAYER PAD
31C VIA
41 GROUND PLANE
41A FIRST EDGE
41B SECOND EDGE
42 GROUND PLANE
42A FIRST EDGE
43 GROUND PLANE
43A FIRST EDGE
50 STUB
50A FIRST PORTION OF STUB
50B SECOND PORTION OF STUB
60 DIELECTRIC SUBSTRATE

The invention claimed is:

1. An antenna device, comprising:

a ground plane having a first edge extending in a first direction;

at least one radiating element spaced apart from the ground plane by a gap in a thickness direction of the ground plane;

a feed line configured to supply a radio frequency signal to the radiating element;

at least two stubs connected to the ground plane and arranged at positions that sandwich the radiating element in the first direction; and a plurality of short circuit vias connecting the at least one radiating element to the ground plane, wherein, in plan view, a distance from the radiating element to the first edge in a second direction orthogonal to the first direction is ¼ or less of a wavelength corresponding to a resonant frequency of the radiating element.

2. The antenna device according to claim 1, wherein a distance from where any of the at least two stubs is connected to the ground plane to the first edge in the second direction is ¼ or less of the wavelength corresponding to the resonant frequency of the radiating element.

3. The antenna device according to claim 1, wherein the radiating element includes a metal plate that together with the ground plane form a patch antenna, the metal plate includes a front edge positioned on a side of the first edge and a rear edge positioned on a side opposite to the front edge in plan view, and a distance from the rear edge to a second edge of the ground plane on a side opposite to the first edge in the second direction is longer than a distance from the front edge to the first edge of the ground plane in the second direction.

4. The antenna device according to claim 2, wherein the radiating element includes a metal plate that together with the ground plane form a patch antenna, the metal plate includes a front edge positioned on a side of the first edge and a rear edge positioned on a side opposite to the front edge in plan view, and a distance from the rear edge to a second edge of the ground plane on a side opposite to the first edge in the second direction is longer than a distance from the front edge to the first edge of the ground plane in the second direction.

5. The antenna device according to claim 3, wherein a distance where any of the at least two stubs is connected to the ground plane to the radiating element in the first direction is 1/15 or more and ¼ or less of the wavelength corresponding to the resonant frequency of the radiating element.

6. The antenna device according to claim 4, wherein a distance where any of the at least two stubs is connected to the ground plane to the radiating element in the first direction is 1/15 or more and ¼ or less of the wavelength corresponding to the resonant frequency of the radiating element.

7. The antenna device according to claim 3, wherein each of the at least two stubs includes a first portion extending from the ground plane in the thickness direction of the ground plane, and a second portion extending from a tip end of the first portion in a direction parallel to the ground plane.

8. The antenna device according to claim 4, wherein each of the at least two stubs includes a first portion extending from the ground plane in the thickness direction of the ground plane, and a second portion extending from a tip end of the first portion in a direction parallel to the ground plane.

9. The antenna device according to claim 5, wherein each of the at least two stubs includes a first portion extending from the ground plane in the thickness direction of the ground plane, and a second portion extending from a tip end of the first portion in a direction parallel to the ground plane.

10. The antenna device according to claim 6, wherein each of the at least two stubs includes a first portion extending from the ground plane in the thickness direction of the ground plane, and a second portion extending from a tip end of the first portion in a direction parallel to the ground plane.

11. The antenna device according to claim 3, wherein a length of each of the at least two stubs is 21% or more and 25% or less of the wavelength corresponding to the resonant frequency of the radiating element.

12. The antenna device according to claim 4, wherein a length of each of the at least two stubs is 21% or more and 25% or less of the wavelength corresponding to the resonant frequency of the radiating element.

13. The antenna device according to claim 5, wherein a length of each of the at least two stubs is 21% or more and 25% or less of the wavelength corresponding to the resonant frequency of the radiating element.

14. The antenna device according to claim 7, wherein a length of each of the at least two stubs is 21% or more and 25% or less of the wavelength corresponding to the resonant frequency of the radiating element.

15. The antenna device according to claim 1, wherein the radiating element includes multiple radiating elements arranged along the first direction, and stubs included in the at least two stubs are arranged at positions that sandwich each of the radiating elements in the first direction, one of the stubs is arranged between two of the radiating elements adjacent to each other in the first direction, and the one of the stubs is shared by the two of the radiating elements.

16. The antenna device according to claim 2, wherein the radiating element includes multiple radiating elements arranged along the first direction, and stubs included in the at least two stubs are arranged at positions that sandwich each of the radiating elements in the first direction, one of the stubs is arranged between two of the radiating elements adjacent to each other in the first direction, and the one of the stubs is shared by the two of the radiating elements.

17. The antenna device according to claim 3, wherein the radiating element includes multiple radiating elements arranged along the first direction, and stubs included in the at least two stubs are arranged at positions that sandwich each of the radiating elements in the first direction, one of the stubs is arranged between two of the radiating elements adjacent to each other in the first direction, and the one of the stubs is shared by the two of the radiating elements.

18. The antenna device according to claim 5, wherein the radiating element includes multiple radiating elements arranged along the first direction, and stubs included in the at least two stubs are arranged at positions that sandwich each of the radiating elements in the first direction, one of the stubs is arranged between two of the radiating elements adjacent to each other in the first direction, and the one of the stubs is shared by the two of the radiating elements.

19. The antenna device according to claim 1, wherein the radiating element includes two linear conductors constituting a dipole antenna, one of the two linear conductors is connected to the feed line, and another of the two linear conductors is connected to the ground plane.

20. The antenna device according to claim 2, wherein the radiating element includes two linear conductors constituting a dipole antenna, one of the two linear conductors is connected to the feed line, and another of the two linear conductors is connected to the ground plane.

* * * * *